(12) United States Patent
Jaśkiewicz et al.

(10) Patent No.: US 10,859,174 B2
(45) Date of Patent: Dec. 8, 2020

(54) CHECK VALVES

(71) Applicant: Hamilton Sundstrand Corporation, Charlotte, NC (US)

(72) Inventors: Zbigniew Jaśkiewicz, Wrocław (PL); Lukasz Wiktorko, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/243,267

(22) Filed: Jan. 9, 2019

(65) Prior Publication Data

US 2019/0211939 A1    Jul. 11, 2019

(30) Foreign Application Priority Data

Jan. 9, 2018  (EP) ..................... 18461501

(51) Int. Cl.
    *F16F 15/03*      (2006.01)
    *F16K 15/03*      (2006.01)
(52) U.S. Cl.
    CPC .......... *F16K 15/038* (2013.01); *F16K 15/036* (2013.01)
(58) Field of Classification Search
    CPC ..... F16K 15/036; F16K 15/038; F16K 47/023
    USPC ....................................... 137/512
    See application file for complete search history.

(56) References Cited

U.S. PATENT DOCUMENTS

| | | |
|---|---|---|
| 4,867,199 A | 9/1989 | Marx |
| 8,869,828 B2 | 10/2014 | Kamp et al. |
| 9,581,256 B2 | 2/2017 | Barone |
| 2014/0041739 A1 | 2/2014 | Barone |
| 2016/0010757 A1 | 1/2016 | Barone |
| 2017/0167632 A1 | 6/2017 | Fiedziuk |
| 2017/0204981 A1 | 7/2017 | Olejak |
| 2017/0356555 A1* | 12/2017 | Solarz ................... F16K 15/038 |

FOREIGN PATENT DOCUMENTS

FR    2930617 A1    10/2009

OTHER PUBLICATIONS

Extended European Search Report for International Application No. 18461501.1 dated Jun. 15, 2018, 6 pages.

* cited by examiner

*Primary Examiner* — P. Macade Nichols
(74) *Attorney, Agent, or Firm* — Cantor Colburn LLP (57) ABSTRACT

A stop pin for a check valve includes a first end and a second end and extending from the first end to the second end in a longitudinal direction along a longitudinal axis. The stop pin also includes at least one slot therein extending in said longitudinal direction, said at least one slot defining a respective at least one flexible, cantilevered tongue having a free end and a connected end connected to said stop pin.

17 Claims, 11 Drawing Sheets

CHECK VALVES

FOREIGN PRIORITY

This application claims priority to European Patent Application No. 18461501.1 filed Jan. 9, 2018, the entire contents of which is incorporated herein by reference.

TECHNICAL FIELD

The present disclosure relates to check valves and to stop pins therefor.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop is provided to limit the rotational movement of the flapper elements as they open. Typically, the stop comprises a stop pin which is mounted to posts arranged on opposed sides of the valve housing opening. The stop pin is spaced from the opening such that when the flappers open, they engage the stop pin.

The flappers may impact the stop pin with some considerable force. This may lead to high stresses occurring in the flappers or the stop pin. To mitigate this possibility, it is known to provide damping between the stop pin and the flappers. A wide range of damping arrangements is known. Example damping arrangements are disclosed in US 2017/0167632 A1, U.S. Pat. Nos. 9,581,256 B and 8,869,828 B.

The present disclosure relates to a check valve of this general construction having a modified damping arrangement.

SUMMARY

From a first aspect, the present disclosure provides a stop pin for a check valve. The stop pin comprises a first end and a second end and extends from the first end to the second end in a longitudinal direction along a longitudinal axis. The stop pin comprises at least one slot therein extending in said longitudinal direction. The at least one slot defines a respective at least one flexible, cantilevered tongue having a free end and a connected end connected to said stop pin.

The connected end of an at least one cantilevered flexible tongue may be attached to the first end or the second end of the stop pin.

The stop pin may comprise first and second flexible cantilevered tongues. The respective connected ends of the first and second flexible cantilevered tongues may be attached to the first end and the second end of the stop pin respectively.

The stop pin may comprise a longitudinally central portion. The connected end of an at least one flexible cantilevered tongue may be attached to the longitudinally central portion of the stop pin.

The stop pin may comprise third and fourth flexible cantilevered tongues. The respective connected ends of the third and fourth flexible cantilevered tongues may be attached to the longitudinally central portion of the stop pin and extend in opposite directions therefrom towards the respective first and second ends of the stop pin.

Respective slots and tongues may be provided on opposed sides of the longitudinal axis of the stop pin.

The respective slots and tongues may be located opposite one another on opposed sides of the longitudinal axis of the stop pin.

The respective slots and tongues may be provided symmetrically in the stop pin.

The at least one slot may be L-shaped.

An end or corner of the at least one slot may be rounded.

The stop pin may comprise a keying formation provided at at least one end thereof.

The stop pin may comprise a generally circular, rectangular and/or trapezium-like cross-sectional shape.

From another aspect of the present disclosure, there is provided a check valve comprising a valve housing, a pair of flappers and a stop pin. The valve housing defines a pair of valve openings. The pair of flappers are pivotably mounted for rotation relative to the housing between an open position in which they permit fluid flow through the respective valve openings and a closed position in which they prevent fluid flow through the valve openings. The stop pin may be arranged such that the flappers, when in the open position, will each contact at least one flexible cantilevered tongue of the stop pin.

Each flapper may comprise one or more raised portions configured to contact the free end of the cantilevered flexible tongue in the open position.

Each flapper may comprise a primary flapper element pivotally mounted to a hinge pin extending across the valve and a secondary flapper element. The primary flapper element may further comprise at least one flapper opening formed therethrough. The secondary flapper element may be pivotally mounted such that it may rotate relative to the primary flapper element for opening and closing the at least one flapper opening in the primary flapper element. The primary and secondary flapper element may each contact at least one respective flexible cantilevered tongue in the open position.

The flapper and stop pin may be configured such that there is planar engagement between the flapper and the stop pin in the open position.

From yet another aspect of the present disclosure, there is provided a method of making a stop pin comprising machining at least one slot into the stop pin. The machining may comprise one of grinding, wire-Electrical Discharge Machining (EDM) or milling.

BRIEF DESCRIPTION OF DRAWINGS

Various embodiments of this disclosure will now be described by way of example only, with reference to the accompanying drawings in which.

DETAILED DESCRIPTION

Figure 1:
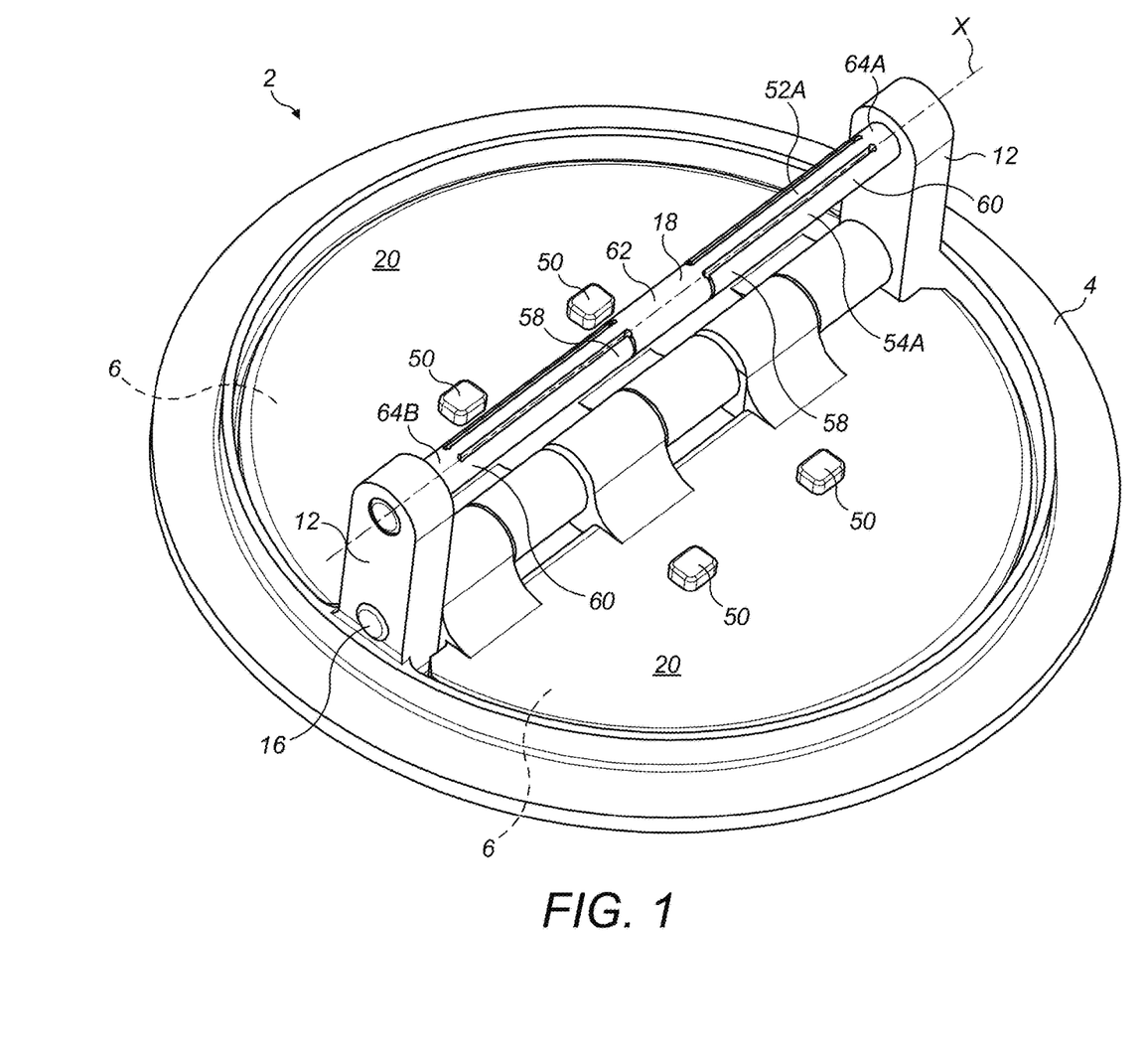
FIG. 1 shows a perspective view of a first embodiment of check valve in accordance with this disclosure.
Figure 2:
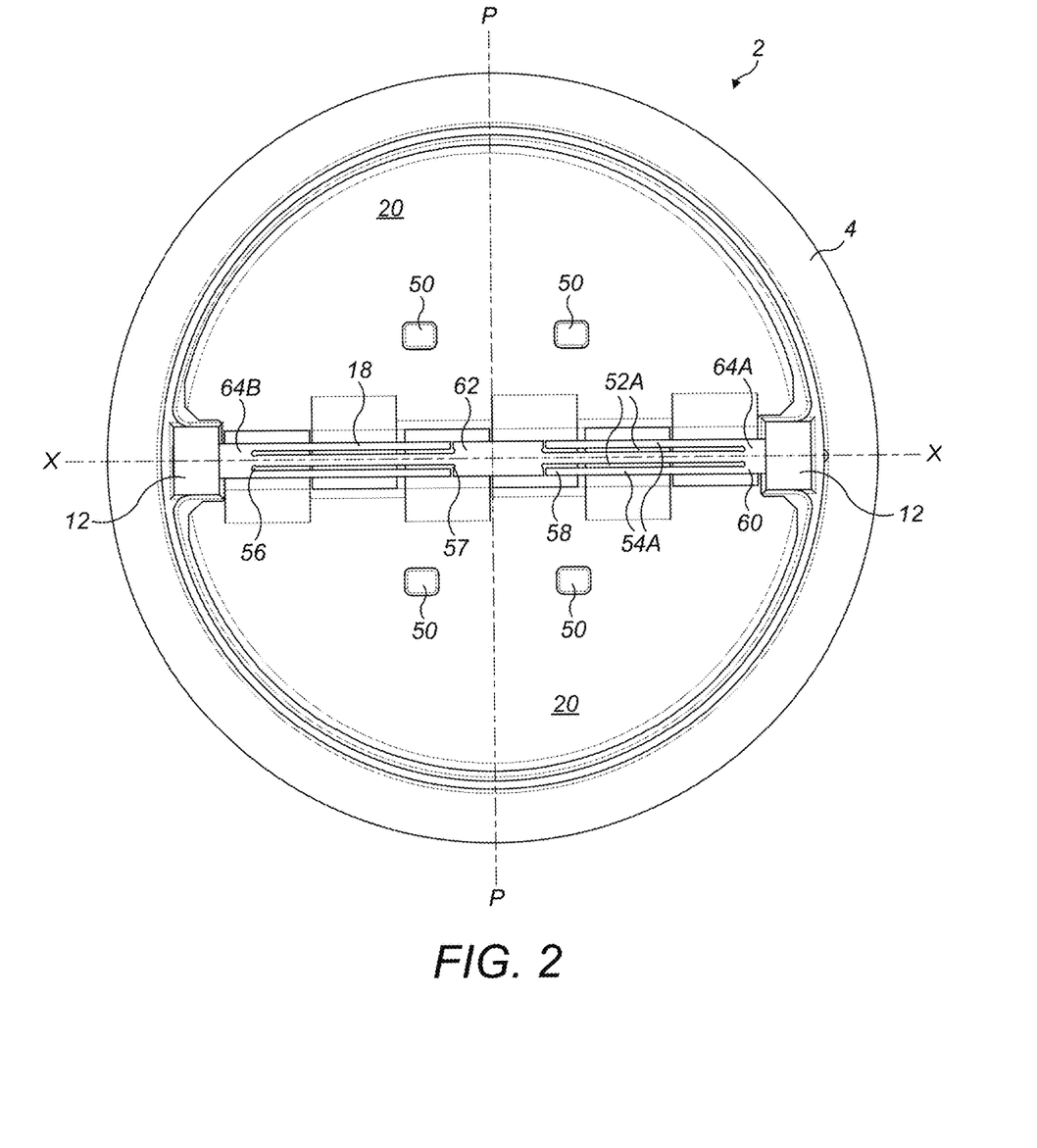
FIG. 2 shows a plan view of the check valve of FIG. 1.

With reference to FIGS. 1 and 2, a first embodiment of check valve 2 in accordance with this disclosure is illustrated.

The check valve 2 comprises a valve housing 4. The valve housing 4 is a generally planar annular element which in use may be mounted in a pipe, duct or the like. The valve housing 4 comprises a pair of generally D-shaped valve openings 6 which are separated by a central web 8 of the valve housing 4.

Figure 3:
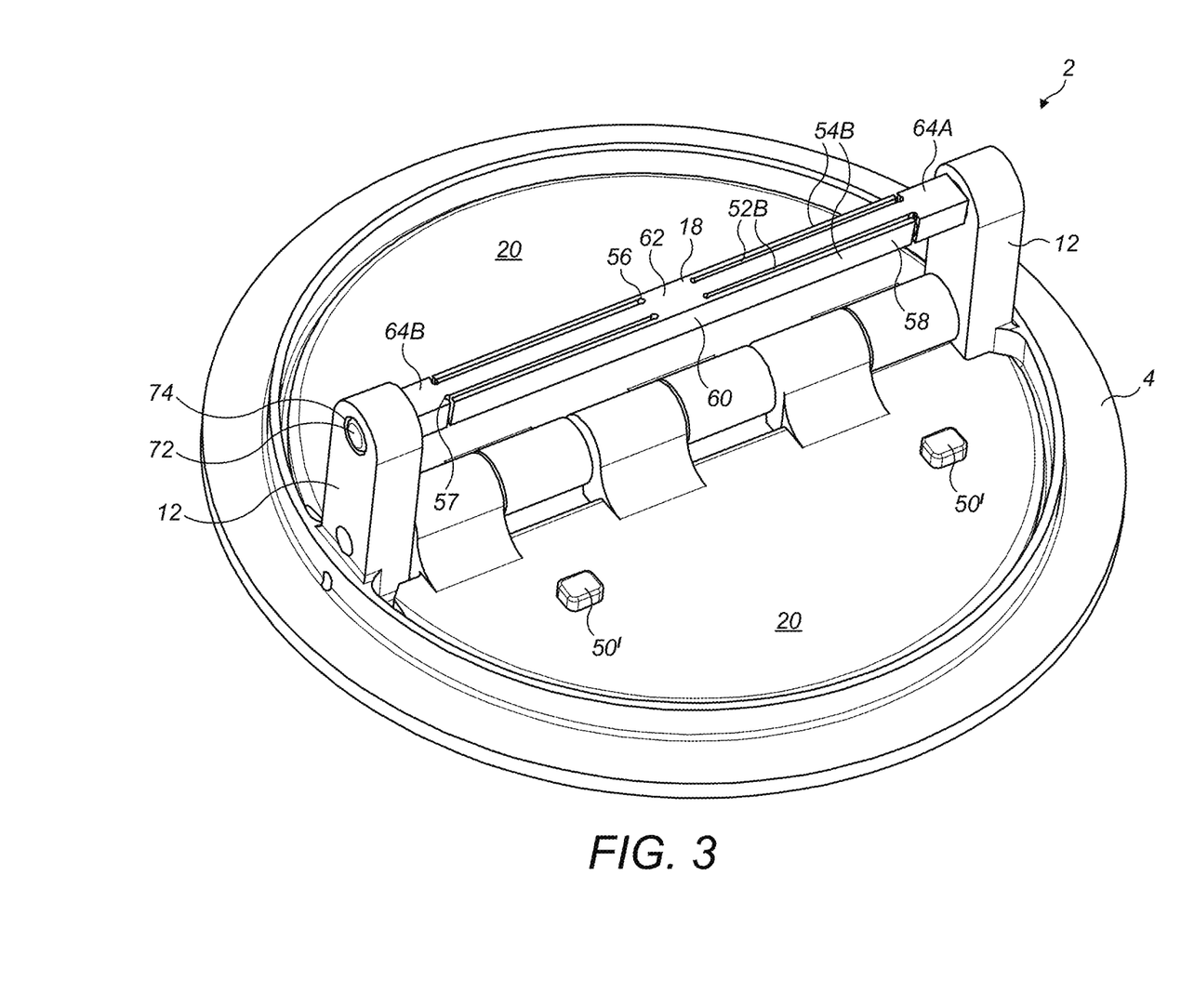
FIG. 3 shows a perspective view of a second embodiment of check valve in accordance with the disclosure.
Figure 4:
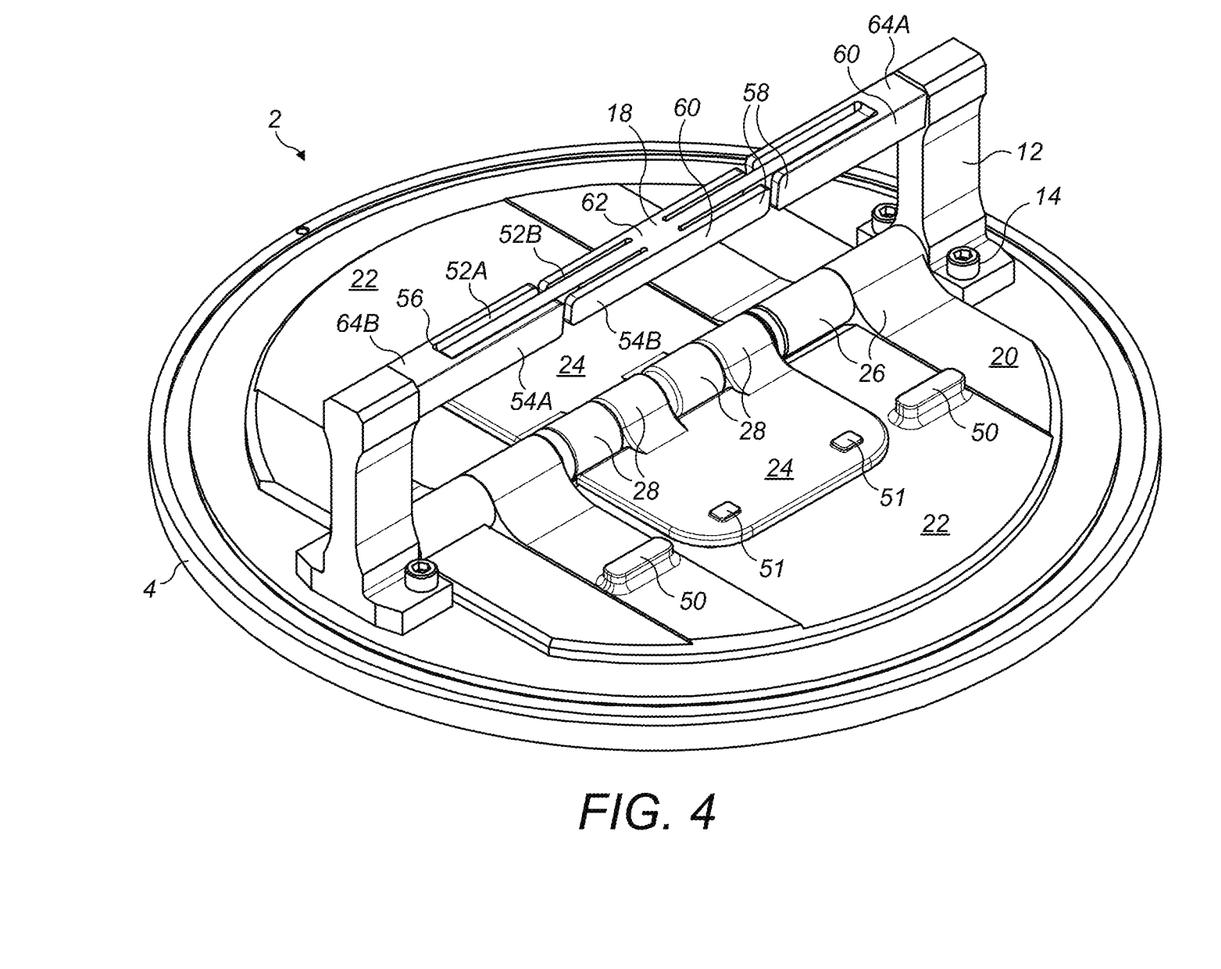
FIG. 4 shows a perspective view of a third embodiment of check valve in accordance with the disclosure.
Figure 5:
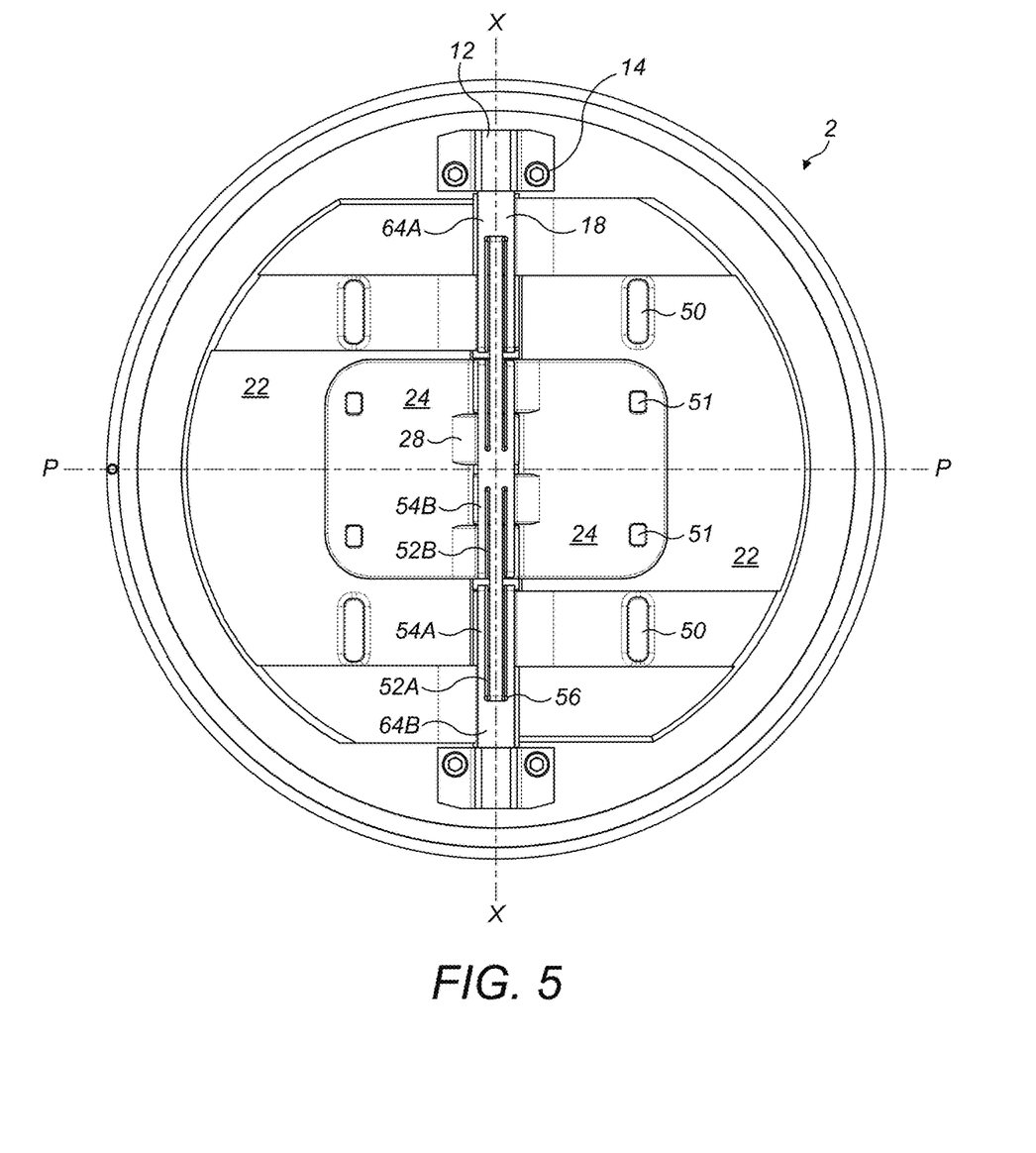
FIG. 5 shows a plan view of the check valve of FIG. 4 with the flappers closed.
Figure 6:
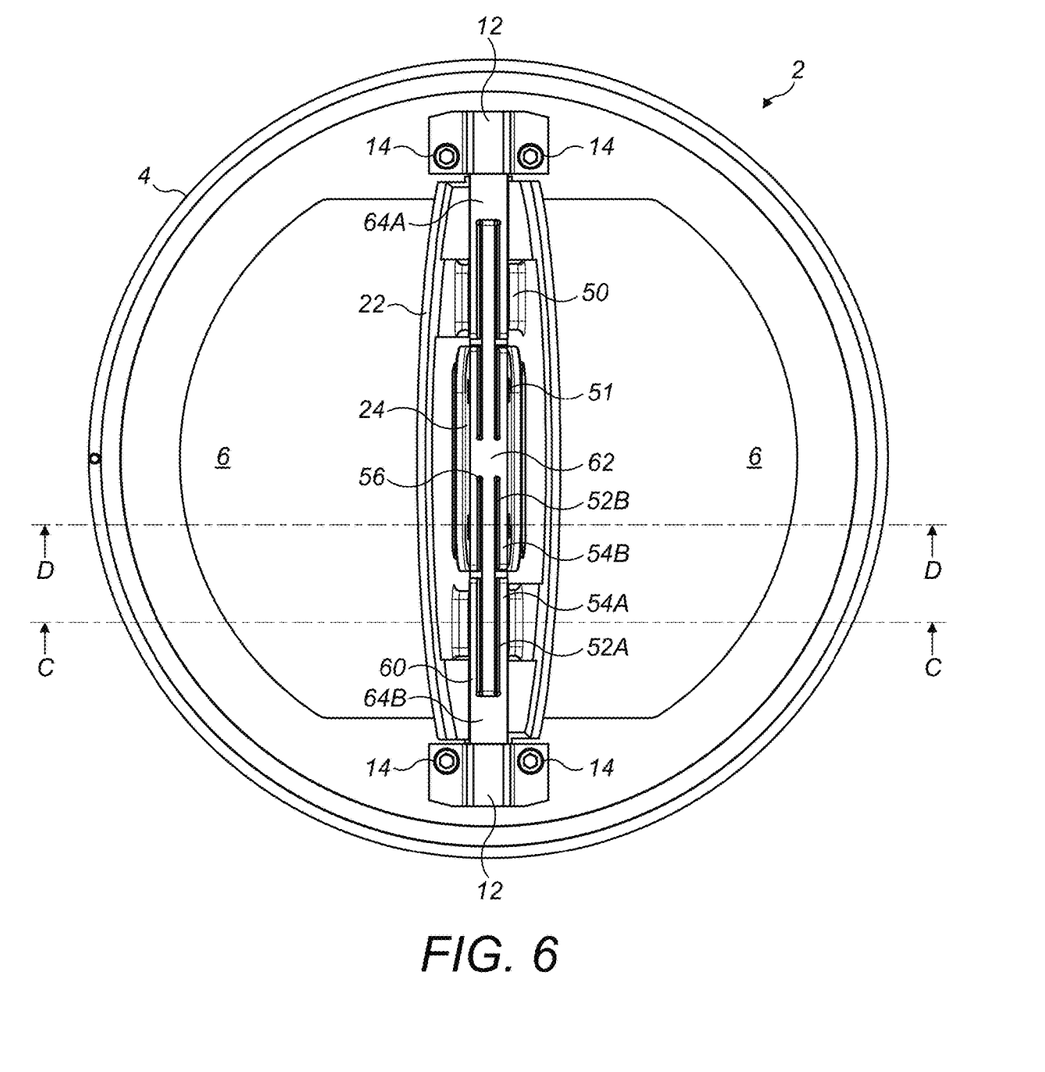
FIG. 6 shows a plan view of the check valve of FIG. 4 with the flappers open.

A pair of mounting posts 12 extend upwardly from the valve housing 4. As shown in FIGS. 1 to 3, the mounting posts 12 may be integrally formed, for example cast, with the valve housing 4. Alternatively, the mounting posts 12 may be separately formed from the valve housing and mounted thereto by suitable means, for example by bolts or other fasteners 14 as illustrated in FIGS. 4 to 6, which describe a further embodiment of the disclosure.

A hinge pin 16 is mounted between the mounting posts 12 above the central web 8. The hinge pin 16 may be a unitary structure as shown, or be constituted from two or more sections. A stop pin 18 is also mounted between the mounting posts 12, above the hinge pin 16. The term pin as used herein does not imply any particular shape or dimension. For example, while the stop pin 18 is shown in this embodiment as circular in cross section, it could have other cross sectional shapes, as will be discussed further below. It also encompasses multi-part constructions as well as unitary constructions.

The valve openings 6 are closed by a pair of generally D-shaped flappers 20 which are pivotally mounted to the hinge pin 16. As is known in the art, the flappers 20 are pivotally mounted to the hinge pin 16 by respective mounting lugs and are pivotable between the closed position illustrated in which they close the valve openings 6, thereby preventing flow through the check valve, and an open position (FIGS. 6 to 8) in which the flappers 20 permit flow to pass through the valve openings 6. In the open position the flappers each engage the stop pin 18.

In this embodiment, each flapper 20 is provided with one or more regions, for example a pair of raised portions 50 (for example, bumpers 50) which, when the flapper 20 is in the open position, will engage the stop pin 18.

The general construction described above is, in general terms, well known. Where the present disclosure departs from this is in the form of the stop pin.

The stop pin 18 extends from a first end 64A of the stop pin 18 to a second end 64B of the stop pin 18 in a longitudinal direction along a longitudinal axis X of the stop pin 18. The stop pin 18 is generally cylindrical, having a generally circular cross section. However, this is not essential and as will be described further below, other cross sectional shapes are envisaged.

The stop pin 18 comprises four slots 52A, therein. The slots 52A, each extend in the longitudinal direction of the stop pin 18. Each slot 52A, defines a respective flexible, cantilevered tongue 54A. Each tongue 54A has a free end 58 and a connected end 60. The connected end 60 of the tongue 54A is connected to the stop pin 18.

In the embodiment shown in FIGS. 1 and 2, the connected end 60 of each tongue 54A is connected to either the first or the second end 64A,B of the stop pin 18, such that the tongues 54A extend towards one another, towards a longitudinally central portion 62 of the stop pin 18. Thus the connected ends 60 of two of the tongues 54A are connected to the first end 64A of the stop pin 18 and the connected ends 60 of the other two of the tongues 54A are connected to the second end 64B of the stop pin 18. The respective slots 52A and tongues 54A are provided in two pairs, the respective slots 52A and tongues 54A of each pair being located opposite one another on opposite sides of the longitudinal axis X of the stop pin 18. The illustrated respective slots 52A and tongues 54A are provided symmetrically with respect to a plane P perpendicular to the longitudinal axis X of the stop pin 18.

Each of slots 52A shown in FIGS. 1 and 2 is generally L-shaped, having a short portion extending laterally into the pin 18, and an elongate main longitudinally extending section. As can best be seen in FIG. 2, the end 56 and corner 57 of each slot 52A is rounded, for example with a circular enlargement. Rounding the ends 56 and/or corners 57 of the slots 52A may reduce stress concentrations in the stop pin 18 and tongues 54A.

The stop pin 18 is arranged with the check valve 2 such that in the open position of the valve 2 the bumpers 50 will contact the flexible cantilevered tongues 54A. When the bumpers contact the tongues 54A, the tongues 54A will flex inwardly towards the stop pin 18, thereby damping the impact of the flappers 20 on the stop pin 18. This mitigates impact stresses created within the stop pin 18 and the flappers 20, thereby potentially improving the life of the stop in 18 and flappers 20.

The degree of damping achieved can be varied by varying the point of impact of the flappers 20 on the tongues 54A, and the size and shape of the tongues 54A, as will be discussed further below.

An alternative embodiment of check valve 2 and stop pin 18 in accordance with the disclosure is illustrated in FIG. 3.

The general construction of check valve 2 is the same as that of FIGS. 1 and 2, but the construction of the stop pin 18 and arrangement of the bumpers 50' is different.

The stop pin 18 shown in FIG. 3 comprises four slots 52B and flexible cantilevered tongues 54B. However, the tongues 54B of FIG. 3 differ from the tongues 54A of FIGS. 1 and 2 in that the connected ends 60 of the tongues 54B are attached to the longitudinally central portion 62 of the stop pin 18 rather than to the ends 64A, 64B of the stop pin 18. The tongues 54B therefore extend away from the central longitudinal portion 62 in opposite directions towards the ends 64A, 64B of the stop pin 18. The bumpers 50' are spaced further apart than the bumpers 50 shown in FIGS. 1 and 2 due to the reconfiguration of the tongues 54B.

A yet further embodiment of check valve in accordance with the disclosure is described with reference to FIGS. 4 to 8.

In this embodiment, each flapper element 20 comprises a primary flapper element 22 and a secondary flapper element 24. The primary flapper element 22 and the secondary flapper element 24 are separately pivotally mounted to the hinge pin 16. Each primary flapper element 22 has a pair of primary mounting lugs 26 arranged one on either side of the associated secondary flapper element 24. Each secondary flapper element 24 has a pair of secondary mounting lugs 28. The secondary mounting lugs 28 of the two secondary flapper elements 24 are arranged in an alternating fashion along the hinge pin 16.

Each primary flapper element 22 is generally planar and is D-shaped in shape. The lower surface of each primary flapper element 22 is formed with a peripheral lip which is configured to engage around the periphery of the associated valve housing opening 6 when the valve 2 is closed.

A flapper opening 34 is formed through a central region 36 each primary flapper element 22. In this embodiment, the flapper opening is generally rectangular in shape, but other shapes of flapper opening 34, for example circular, oval or ellipsoidal, are contemplated within the scope of the disclosure. The flapper opening 34 is positioned generally centrally between the sides of each primary flapper element 22, between the mounting lugs 26 of the primary flapper element 22, but is offset from the centre of the primary flapper element 22 in a direction towards the hinge pin 16 or mounting lugs 26. The stresses in this region of the primary flapper element 22 will be relatively low. A check valve of this type is known from US 2017/0204981 A1. However, this embodiment differs from the arrangement disclosed therein in the construction of the stop pin 18 and bumpers 50, 51.

In this embodiment, the stop pin 18 comprises slots 52A, B which define both flexible cantilevered tongues 54A with connected ends 60 attached to the stop pin 18 at respective first or second ends 64A,B of the stop pin, and flexible cantilevered tongues 54B with connected ends 60 attached to the stop pin 18 at the longitudinally central portion 62 of the stop pin 18. The flexible cantilevered tongues 54B extend in opposite directions to respective tongues 54A and towards the respective first and second ends 64A,B of the stop pin 18.

The primary flapper element 22 comprises bumpers 50 arranged to contact respective flexible cantilevered tongues 54A in the open position, and the secondary flapper element 24 comprises bumpers 51 arranged to contact respective flexible cantilevered tongues 54B in the open position.

Thus in this embodiment, both the primary and secondary flapper elements 22, 24 will contact respective tongues 54A, 54B, thereby damping the impact of both flapper elements 22, 24 on the stop pin.

The configuration of the stop pin 18 and the bumpers 50, 51 may be such that the primary and secondary flapper elements 22, 24 do not contact each other in the open position, but only contact the stop pin 18. This may avoid stresses in the flapper elements 22, 24 due to impacts therebetween.

Figure 7:
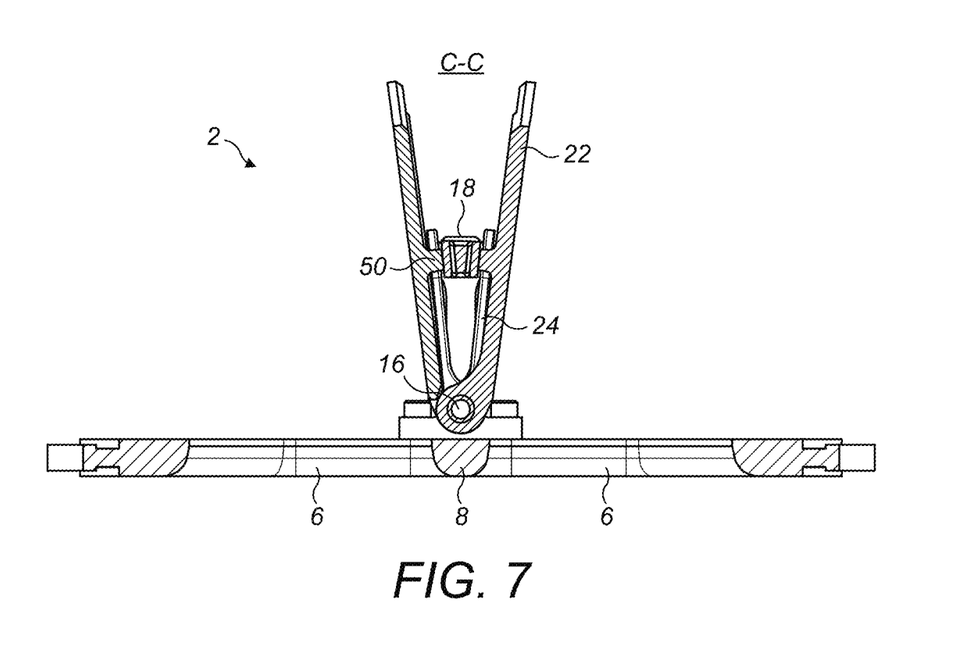
FIG. 7 shows a sectional view along line C-C of FIG. 6.
Figure 8:
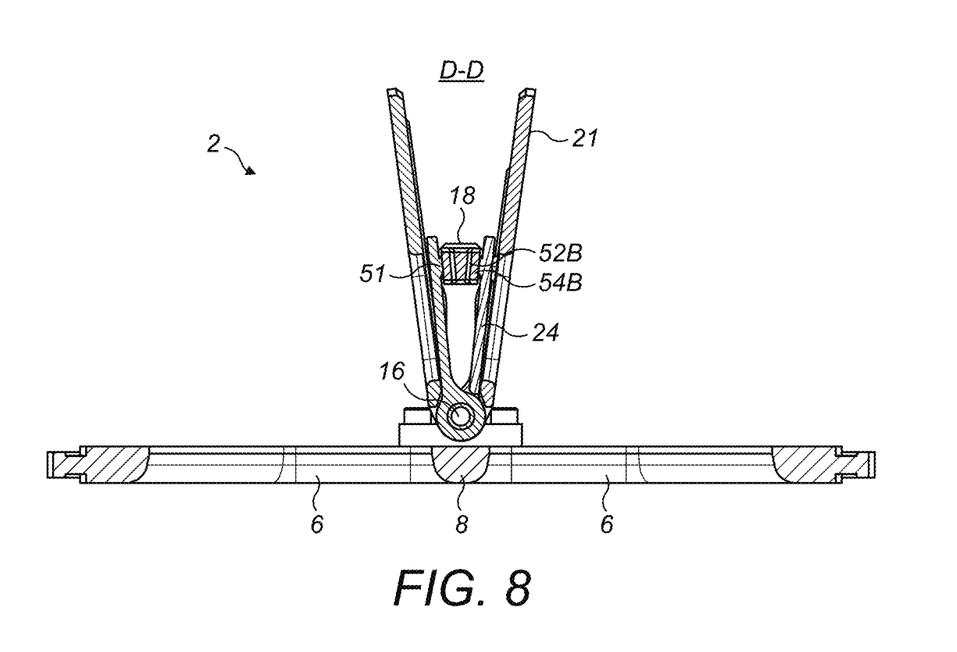
FIG. 8 shows a sectional view along line D-D of FIG. 6.

It will be seen from FIGS. 7 and 8 that the flappers and stop pin 18 are configured such that there is a planar engagement, rather than a line engagement, between the primary and secondary flapper elements 22,24 and the stop pin 18. In this embodiment, this is achieved by virtue of the contact surfaces of the stop pin tongues 54A, 54B being angled as shown. Thus the stop pin 18 may have, at least in part, a trapezium-like cross section as illustrated. In other embodiments, the contact surface of the bumpers 50, 51 may additionally or alternatively be appropriately angled to achieve the planar engagement.

This feature may be applied generally in other embodiments of the disclosure, for example in that of FIG. 3.

Figure 9:
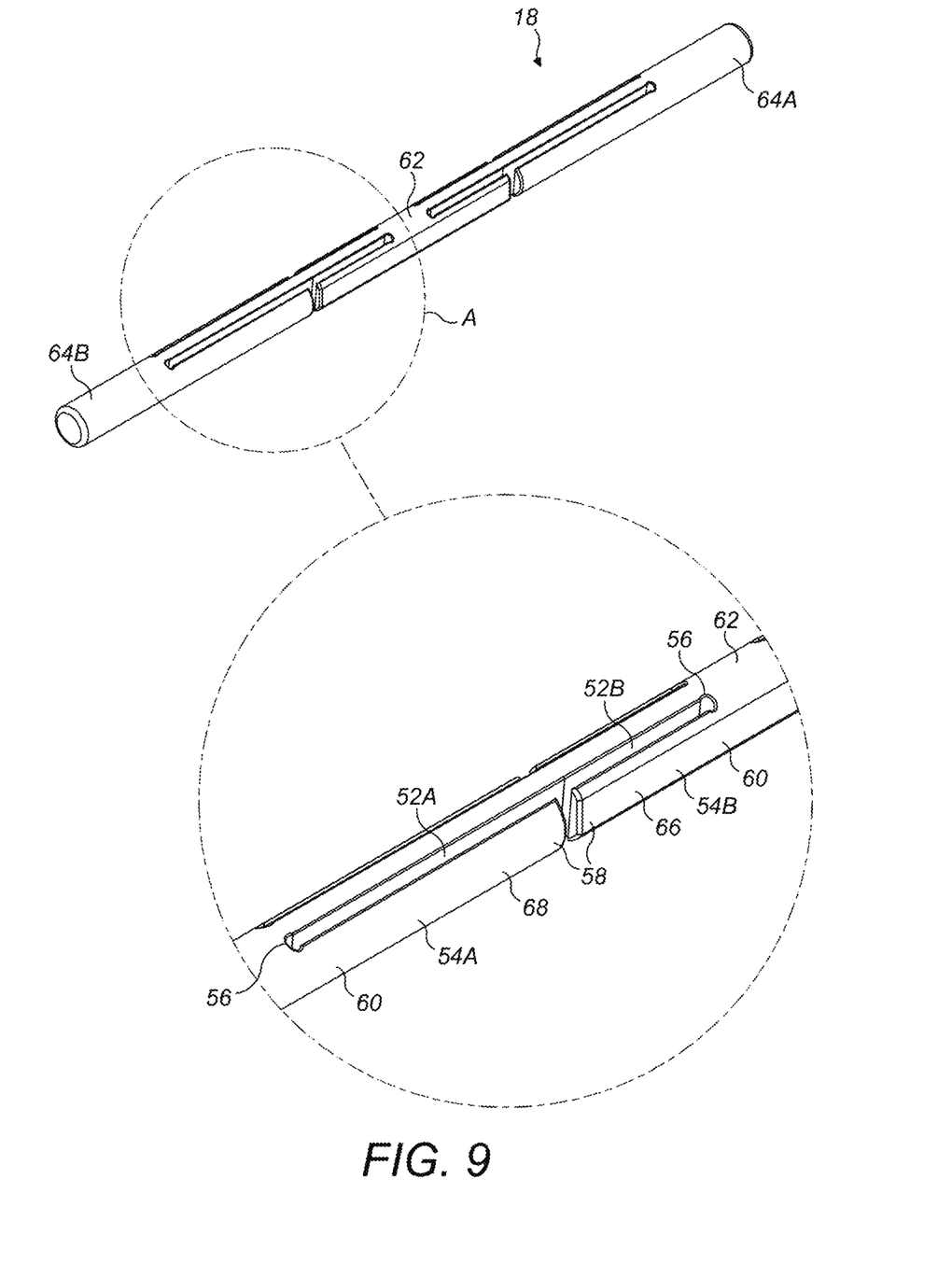
FIG. 9 shows an alternative embodiment of a stop pin suitable for the check valve of FIG. 4.
Figure 10:
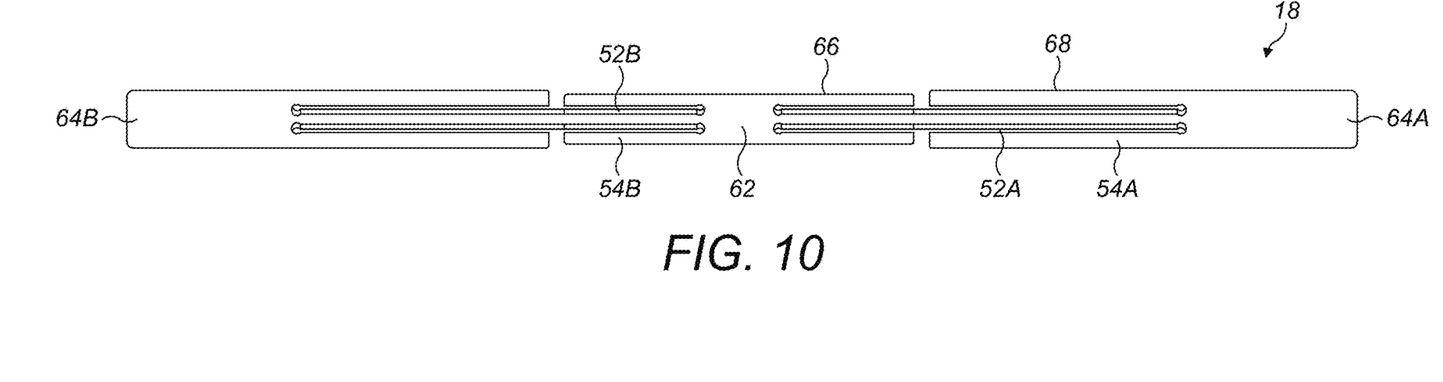
FIG. 10 shows a plan view of the stop pin of FIG. 9.
Figure 11:
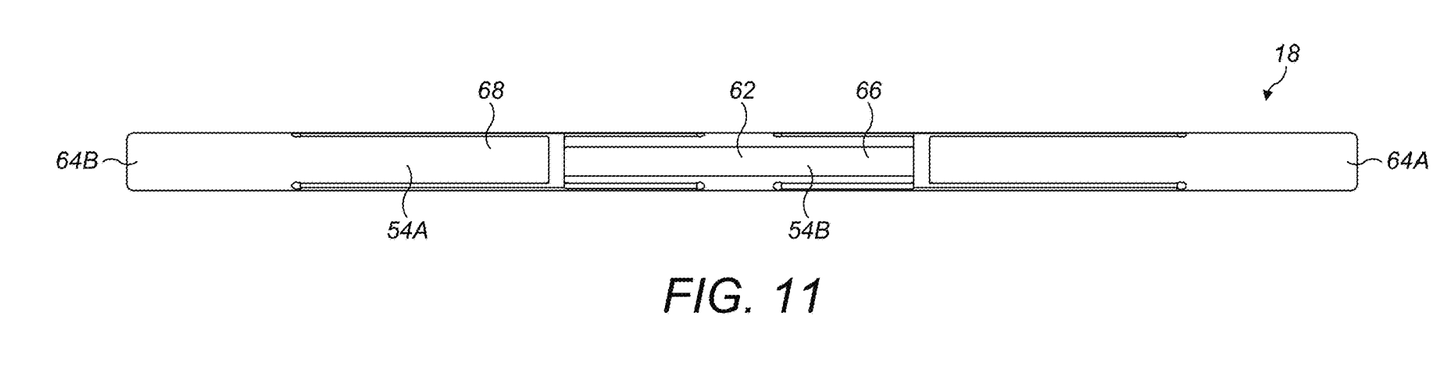
FIG. 11 shows a front elevational view of the stop pin of FIG. 9.

An alternative embodiment of a stop pin 18 suitable for use in the check valve of FIG. 4 is shown in FIGS. 9 to 11. From here it can be seen that as in the embodiment of FIG. 1, the stop pin 18 may be generally circular in cross section. In this embodiment, however, the tongues 54B attached to the longitudinally central portion 62 of the stop pin 18 each include a flat contact surface 66 configured to contact the bumper 51 of the secondary flapper pin 24 described above. The flat contact surface 66 is therefore recessed relative to the rounded contact surfaces 68 provided on the tongues 54A connected to the first or second ends 64A, B of the stop pin 18. The flat contact surface 66 may be an artefact of a machining process used to form the slots 52A, B and tongues 54A, B with particular dimensions. As can be appreciated from FIGS. 9 to 11, and described further below with regard to FIGS. 12 and 13, each tongue 54A, B may have different dimensions.

Figure 12:
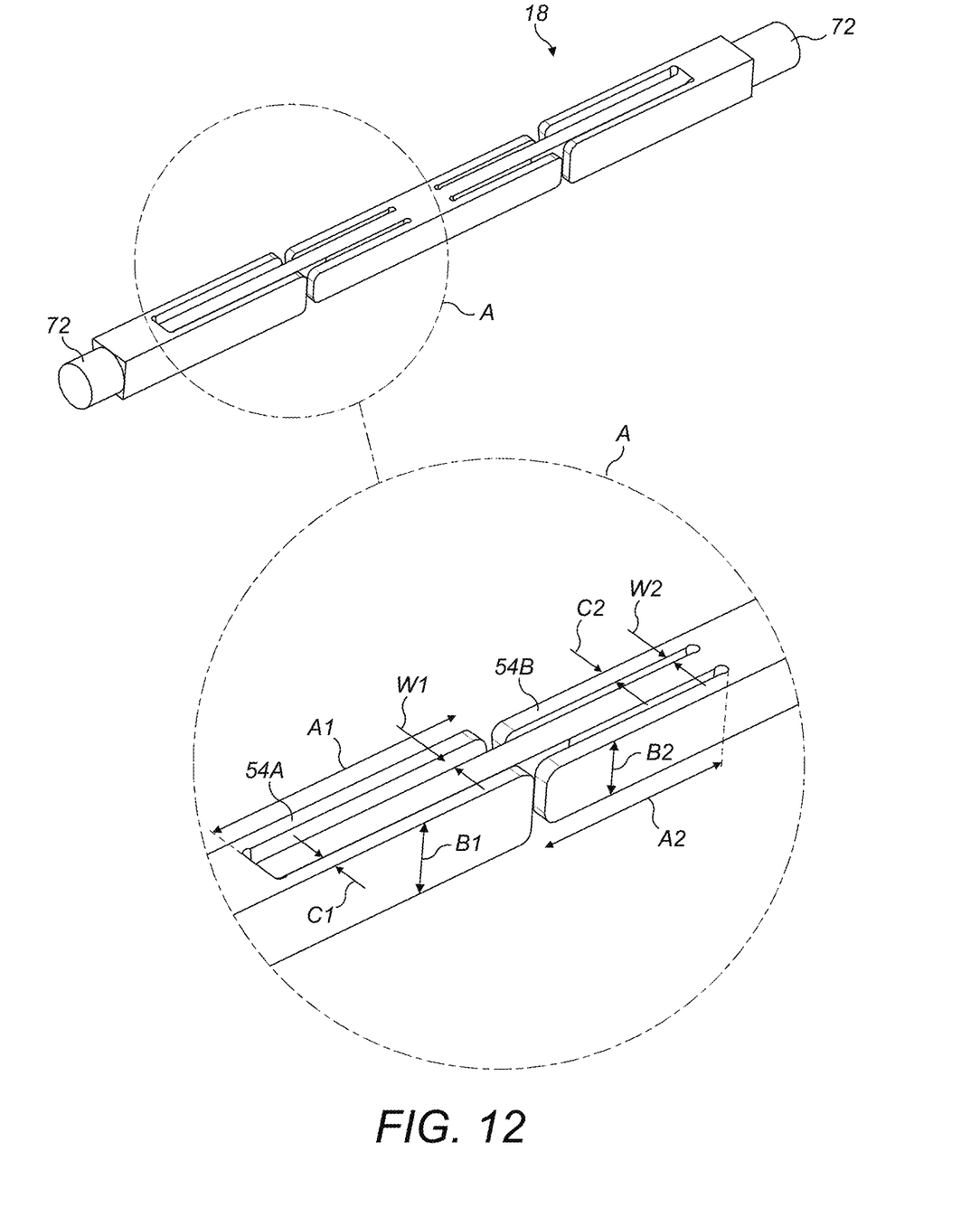
FIG. 12 shows the stop pin of the check valve of FIG. 4.
Figure 13:
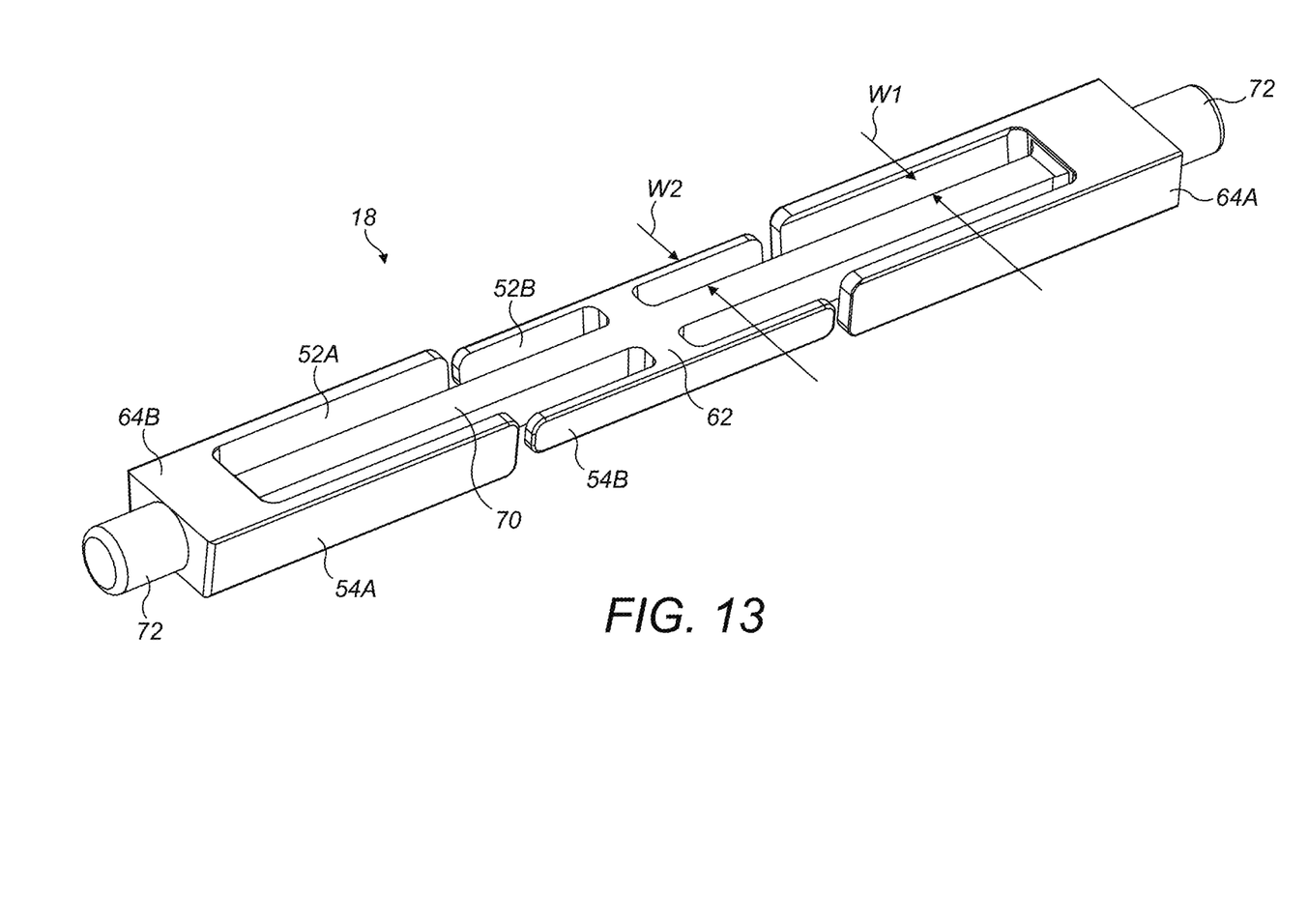
FIG. 13 shows a yet further embodiment of stop pin.

FIG. 12 shows the stop pin of FIG. 4 in more detail. FIG. 13 illustrate an alternative embodiment of stop pins 18, with a rectangular cross-sectional shape. In these embodiments the tongues 54B attached to the longitudinally central portion 62 have a length A2, a width B2 and a thickness C2 and the tongues 54B attached to the first or second ends 64A,B of the stop pin 18 have a length A1, a width B1 and a thickness C1. In these embodiments the length A1 is greater than the length A2, the width B1 greater than the width B2 and the thickness C1 greater than the thickness C2. The slots 52A, B have widths W1 and W2 respectively. This is at least in part to accommodate the higher forces generated by the primary flapper elements 22. The widths W1, W2 of the slots 52A, B are larger in the embodiment shown in FIG. 13 than in the embodiment shown in FIG. 12.

Lengths A1, A2, widths B1, B2, W1, W2 and thicknesses C1, C2 may be chosen in any particular application so as to provide the desired level of damping. It will be understood that changing these dimensions measurements will change the flexibility of the tongues 54A, B and therefore the damping effect they provide.

As can be seen particularly clearly in FIG. 13, an entire axially central section 70 of the stop pin 18 may be thinned down relative to the ends 64a, 64B of the stop pin 18. This may provide a weight saving, which is of particular importance in aircraft applications.

It will be seen that the ends 64A, 64B of the stop pin 18 in these embodiments are provided with mounting pins 72 for mounting in respective openings in the mounting posts 12 of the valve housing 4.

Appropriate means may be provided to prevent rotation of the stop pin 18 in the mounting post openings 72. For example, keying formation(s) (not shown) may be provided on either end 64A, 64B of the stop pin 18. These keying formations may be configured to key with corresponding keying formations which may be provided in the mounting posts 12. In other embodiments, the stop pin 18 may be held in the appropriate rotational position by a suitable fastener.

The stop pin 18 may be made from any suitable material, for example a metal such as steel.

The stop pin 18 may be cast, forged or machined. The slots 52a, 52B may be machined into the stop pin 18, thereby forming the tongues 54A, 54B. The machining may include grinding, Electrical Discharge Machining (EDM) or milling. Wire EDM may be a particularly suitable method for creating the slots 52A, 52B.

It will be appreciated that the above description is of a number of embodiments and that modifications may be made to those embodiments without departing from the scope of the disclosure. For example, features of the various embodiments may be combined as appropriate.

The invention claimed is:

1. A stop pin for a check valve, the stop pin comprising:
   a first end and a second end and extending from the first end to the second end in a longitudinal direction along a longitudinal axis;
   the stop pin comprising at least one slot therein extending in said longitudinal direction, said at least one slot defining a respective at least one flexible, cantilevered and longitudinally extending tongue having longitudinal a free end and a longitudinal connected end connected to said stop pin.

2. The stop pin as claimed in claim 1, wherein the connected end of an at least one cantilevered flexible tongue is attached to the first end or the second end of the stop pin.

3. The stop pin as claimed in claim 2, comprising first and second flexible cantilevered tongues, the respective connected ends of the first and second flexible cantilevered tongues being attached to the first end and the second end of the stop pin respectively.

4. The stop pin as claimed in claim 1, comprising a longitudinally central portion wherein the connected end of an at least one flexible cantilevered tongue is attached to the longitudinally central portion of the stop pin.

5. The stop pin as claimed in claim 4, comprising third and fourth flexible cantilevered tongues, the respective connected ends of the third and fourth flexible cantilevered tongues being attached to the longitudinally central portion of the stop pin and extending in opposite directions therefrom towards the respective first and second ends of the stop pin.

6. The stop pin as claimed in claim 1, wherein respective slots and tongues are provided on opposed sides of the longitudinal axis of the stop pin.

7. The stop pin as claimed in claim 6, wherein the respective slots and tongues are located opposite one another on opposed sides of the longitudinal axis of the stop pin.

8. The stop pin as claimed in claim 1, wherein respective slots and tongues are provided symmetrically in the stop pin.

9. The stop pin as claimed in claim 1, wherein the at least one slot is L-shaped.

10. The stop pin as claimed in claim 1, wherein an end or corner of the at least one slot is rounded.

11. The stop pin as claimed claim 1, comprising a keying formation provided at least one end thereof.

12. The stop pin as claimed in claim 1, wherein the stop has one of:
   a generally circular, rectangular or trapezium-like cross-sectional shape.

13. The check valve comprising:
   a valve housing defining a pair of valve openings;
   a pair of flappers pivotably mounted for rotation relative to the housing between an open position in which they permit fluid flow through the respective valve openings and a closed position in which they prevent fluid flow through the valve openings; and
   a stop pin as claimed in claim 1;
   wherein the stop pin is arranged such that the flappers, when in the open position, will each contact at least one flexible cantilevered tongue of the stop pin.

14. The check valve as claimed in claim 13, wherein:
   each flapper comprises one or more raised portions configured to contact the free end of the cantilevered flexible tongue in the open position.

15. The check valve as claimed in claim 13 wherein:
   each flapper comprises a primary flapper element pivotally mounted to a hinge pin extending across the valve and a secondary flapper element;
   the primary flapper element further comprises at least one flapper opening formed therethrough;
   the secondary flapper element is pivotally mounted such that it may rotate relative to the primary flapper element for opening and closing the at least one flapper opening in the primary flapper element; and
   the primary and secondary flapper element each contacting at least one respective flexible cantilevered tongue in the open position.

16. The check valve as claimed in claim 13, wherein the flapper and stop pin are configured such that there is planar engagement between the flapper and the stop pin in the open position.

17. A method of making a stop pin as claimed in claim 1, the method comprising:
   machining the at least one slot into the stop pin, wherein the machining optionally comprises one of grinding, wire-Electrical Discharge Machining (EDM) or milling.

* * * * *